US006728846B2

(12) United States Patent
Noyes

(10) Patent No.: US 6,728,846 B2
(45) Date of Patent: Apr. 27, 2004

(54) METHOD AND DATA PROCESSING SYSTEM FOR PERFORMING ATOMIC MULTIPLE WORD WRITES

(75) Inventor: Bruce A. Noyes, Phoenix, AZ (US)

(73) Assignee: Bull HN Information Systems Inc., Billerica, MA (US)

(*) Notice: Subject to any disclaimer, the term of this patent is extended or adjusted under 35 U.S.C. 154(b) by 579 days.

(21) Appl. No.: 09/746,240

(22) Filed: Dec. 22, 2000

(65) Prior Publication Data

US 2002/0083278 A1 Jun. 27, 2002

(51) Int. Cl.$^7$ ............................................. G06F 12/00
(52) U.S. Cl. ...................... 711/156; 711/155; 712/24
(58) Field of Search ............................. 711/154, 155, 711/156; 712/24

(56) References Cited

U.S. PATENT DOCUMENTS

| | | | | |
|---|---|---|---|---|
| 4,794,521 A | * | 12/1988 | Ziegler et al. | 711/130 |
| 5,553,263 A | * | 9/1996 | Kalish et al. | 711/127 |
| 6,032,252 A | * | 2/2000 | Petro et al. | 712/233 |
| 6,360,194 B1 | * | 3/2002 | Egolf | 703/26 |
| 6,460,121 B1 | * | 10/2002 | Bonola | 711/154 |
| 6,477,617 B1 | * | 11/2002 | Golding | 711/112 |
| 6,484,272 B1 | * | 11/2002 | Egolf et al. | 714/30 |

OTHER PUBLICATIONS

Huang, "Fast and fair mutual exclusion for shared memory systems", © 1999 IEEE International Conference on Distributed Computing Systems, p. 224–231.*

Huang, "Fast mutual exclusion algorithms using read–modify–write and atomic read/write registers", © 1998 IEEE International Conference on Parallel and Distributed Systems, p. 292–299.*

Intel Corporation IA–64 Application Developer's Architecture Guide pp.: Contents iii through xii; 2–3, 2–4; 7–16, 7–17; 7–24, 7–25; 7–104, 7–105, 7–106, 7–107; 10–5, 10–6, 10–7, 10–8, 10–9, 10–10, 10–11.

* cited by examiner

Primary Examiner—Donald Sparks
Assistant Examiner—Brian R. Peugh
(74) Attorney, Agent, or Firm—Bruce E. Hayden; Faith F. Driscoll; James H. Phillips

(57) ABSTRACT

Atomic multiple word writes are provided when emulating a target system that supports atomic multiple word writes on a host system that does not. For each except the last word to be written, a gate flag is read, tested, and locked when it is found unlocked. The words are then written to memory in reverse order, unlocking the gate flags as they are written. In a host system with a longer word size than the target system, the gate flags can be stored in otherwise unused bits in the host system words containing the target system words to be written.

19 Claims, 13 Drawing Sheets

METHOD AND DATA PROCESSING SYSTEM FOR PERFORMING ATOMIC MULTIPLE WORD WRITES

CROSS REFERENCE TO RELATED APPLICATIONS

This application is related to our copending patent applications assigned to the assignee hereof "DIFFERENT WORD SIZE MULTIPROCESSOR EMULATION" by David A. Egoif, filed Sep. 8, 1998, with Ser. No. 09/149,261, now U.S. Pat. No. 6,360,194.

"METHOD AND DATA PROCESSING SYSTEM FOR PERFORMING ATOMIC MULTIPLE WORD READS" by Bruce Noyes, filed of even date herewith, with Ser. No. 09/746,792 and assigned to the assignee hereof.

FIELD OF THE INVENTION

The present invention generally relates to computer system emulation, and more specifically to emulation of a target system utilizing a multiprocessor host system with a dissimilar word length.

BACKGROUND OF THE INVENTION

The cost of designing a computer processor continues to increase. Some computer architectures thus ultimately become uneconomical to implement directly, despite these architectures having significant installed bases.

One solution to this problem is to simulate one computer architecture on another computer architecture. Herein, the simulating computer architecture will be termed the "host" computer system, while the simulated computer architecture will be termed the "target" computer system. Emulators have been available almost since the advent of the first compilers.

Emulators typically utilize the same word length and byte length on the host computer system and the target computer system. One reason for this is that it is significantly easier to implement a similar system emulator. Another reason is that most computer architectures presently are 32-bit architectures. However, there is a move toward 64-bit architectures. Two 32-bit words fit exactly within a single 64-bit word. This is not the situation where the target system operates on for example 36 bits, while the host system operates on 64 bits. Any problems encountered when implementing an emulator on a host system are significantly increased when the word size of the emulated target system does not evenly divide the word size of the host system.

When the two architectures have different word sizes the data type alignment of the target data in the emulated host memory will not align with the native data types in the host emulation machine. This is particularly a problem in multiprocessor emulations that require atomicity for updates of adjacent target data types within a cache line of the emulating host system memory. The atomicity of the emulating host system will not match the required atomicity of the emulated target system. This is because the atomicity paradigms of the host system will not properly merge the updates within a cache line.

This would normally be addressed by use of a separate software gating mechanism. A distinct gate would be employed by each instance of the processor emulation in order to perform any data update to the emulated memory where atomicity needed to be enforced. Such a software gating mechanism typically employs hardware instructions to lock and unlock an agreed-to gate operand in order to guarantee single-threaded operation. This software gating mechanism has the potential of adding significant processor, memory, and bus overhead to the operation of the emulator.

The problem is compounded when it is necessary to read and write double words. Double word reads and writes are common in many legacy architectures. It is possible with single word synchronization to have a situation where the first and second words in a double word write are written by two different processors at almost exactly the same time. This would necessarily lead to inconsistent results.

Double word read and write atomicity is important in many architectures and systems. In the preferred embodiment, in the emulation of the GCOS 8 operating system on a target architecture such as the Intel IA-64 architecture that does not fully support double (or more) atomic reads and writes, atomic double word reads and writes are important in maintaining system security since system security is built around double word descriptors. Lack of double (or more) word atomicity may open up significant security holes in the GCOS 8 operating systems.

It would thus be advantageous to be able to emulate efficiently a target system that has a word size and/or byte size that is not the same as that of the emulating host system. It would be even more advantageous to be able to emulate efficiently such a system when the word size of the host system is not an even multiple of the word size of the emulated target system. In performing this emulation, an efficient mechanism for reading and writing double word cached memory contents without violating atomicity constraints of an emulated target system would also be advantageous.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Atomic multiple word writes are provided when emulating a target system that supports atomic multiple word writes on a host system that does not. For each except the last word to be written, a gate flag is read, tested, and locked when it is found unlocked. The words are then written to memory in reverse order, unlocking the gate flags as they are written. In a host system with a longer word size than the target system, the gate flags can be stored in otherwise unused bits in the host system words containing the target system words to be written.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. The term "bus" will be used to refer to a plurality of signals or conductors which may be used to transfer one or more various types of information, such as data, addresses, control, or status.

A host system emulates a target system that has a word size with fewer bits than the word size of the host system. Data is stored in RAM, on disk, and on tape preferably in a right-justified form. However, the present invention will also work with other justifications. This justified form is useful in performing fixed-point arithmetic computations. The unused high order bits may be used for other purposes.

Figure 1:
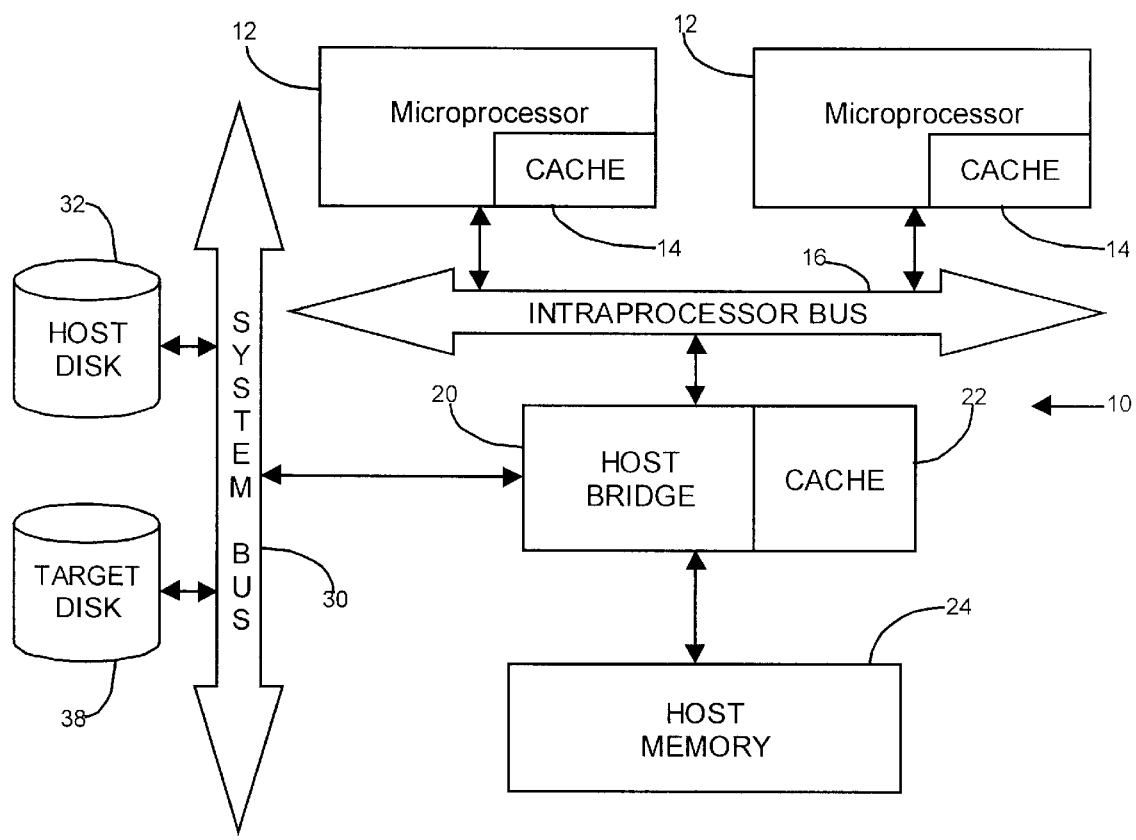
FIG. 1 is a block diagram illustrating a multiprocessor host system utilized to emulate a target system with a narrower word size, in accordance with the present invention.

FIG. 1 is a block diagram illustrating a multiprocessor host system utilized to emulate a target system with a narrower word size. In the preferred embodiment, the host system utilizes 64-bit words, whereas the target system supports 36-bit words. A multiprocessor system is shown in order to provide the level of performance necessary to emulate large-scale enterprise level target systems. The multiprocessor system 10 shows two (2) microprocessors 12, each containing its own copy of level-one (L1) cache memory 14. Some examples of microprocessors include Pentium II (IA-32) and Itanium (IA-64) microprocessors from Intel Corporation, PowerPC microprocessors from Motorola, Inc. and IBM, and SPARC processors from Sun Microsystems. The L1 cache is typically implemented as extremely high-speed static random access memory (SRAM). The L1 cache may be implemented on the same semiconductor die as the microprocessor 12, or may be implemented as part of a multi-chip-module (MCM) with the microprocessor 12. In any case, the L1 cache 14 for each microprocessor 12 is dedicated to that microprocessor 12. Note that two microprocessors are shown. This is for illustrative purposes, and it is understood that this invention envisions additional microprocessors.

The two shown microprocessors 12 are coupled by and communicate over an intraprocessor bus 16. One of the functions of this intraprocessor bus 16 is to allow the two microprocessors 12 to communicate sufficiently so as to maintain coherence between their respective L1 caches 14. A single bus has been shown. However, multiple busses are also within the scope of this invention.

Also coupled to the intraprocessor bus 16 is a host bridge 20. This provides communications between the microprocessors 12 and the remainder of the computer system 10. Shown attached (but alternatively coupled) to the host bridge is a level-two (L2) cache 22. This L2 cache 22 is shared by all of the processors 12 in the system 10. The L2 cache 22 also typically consists of SRAM. However, it need not be as fast as the L1 cache 14, which typically operates at a speed comparable to that of the processors 12. Instead, a typical system will contain significantly more L2 cache 22 than L1 cache 14. Coupled to the Host Bridge 20 is also host memory 24. This is typically Dynamic Random Access Memory (DRAM). However, other types of memory may be utilized, including SRAM. Host memories 24 typically contain several orders of magnitude more memory than either the L1 cache 14 or the L2 cache 22.

Also coupled to the Host Bridge 20 is a system bus 30. The system bus 30 is utilized to couple the system 10 to lower speed peripheral devices. These lower speed peripheral devices can include display monitors, keyboards, communications devices, and the like (not shown here). Also coupled to the system bus are disk drives and other forms of storage capable of permanently storing data for the computer system 10. Shown in this figure are a host disk drive 32 and a target disk drive 38. The host disk drive 32 typically contains the software required to emulate the target system on the host system. The target disk drive 38 contains the software being emulated. It should be noted that the host disk drive 32 is shown distinct from the target disk drive 38. Additionally, only a single host disk drive 32 and target disk drive 38 are shown. It is shown this way for illustrative purposes. However, the present invention also envisions combining the two on shared drives. It must also be noted that the target disk drive 38 will often actually consist of a large number of different physical disk drives. This is especially true when host systems capable of supporting enterprise level databases are emulated.

Memory is considered herein a relatively high speed machine readable medium and includes Volatile Memories, such as DRAM 24, and SRAM 14, 22, and Non-Volatile Memories (not shown) such as, ROM, FLASH, EPROM, EEPROM, and bubble memory. Secondary Storage 32, 38 includes machine-readable media such as hard disk drives, magnetic drum, and bubble memory. External Storage (not shown) includes machine-readable media such as floppy disks, removable hard drives, magnetic tape, CD-ROM, and even other computers, possibly connected via a communications line. The distinction drawn here between Secondary Storage 32, 38 and External Storage is primarily for convenience in describing the invention. As such, it should be appreciated that there is substantial functional overlap between these elements. Computer software such as target emulation software and user programs can be stored in a Computer Software Storage Medium, such as Memory 14, 22, 24, Secondary Storage 32, 38, and External Storage. Executable versions of computer software can be read from a Non-Volatile Storage Medium such as External Storage (not shown), Secondary Storage 32, 38, and Non-Volatile Memory (not shown), and loaded for execution directly into Volatile Memory 14, 22, 24, executed directly out of Non-Volatile Memory, or stored on the Secondary Storage 32, 38 prior to loading into Volatile Memory 14, 22, 24 for execution.

Figure 2:
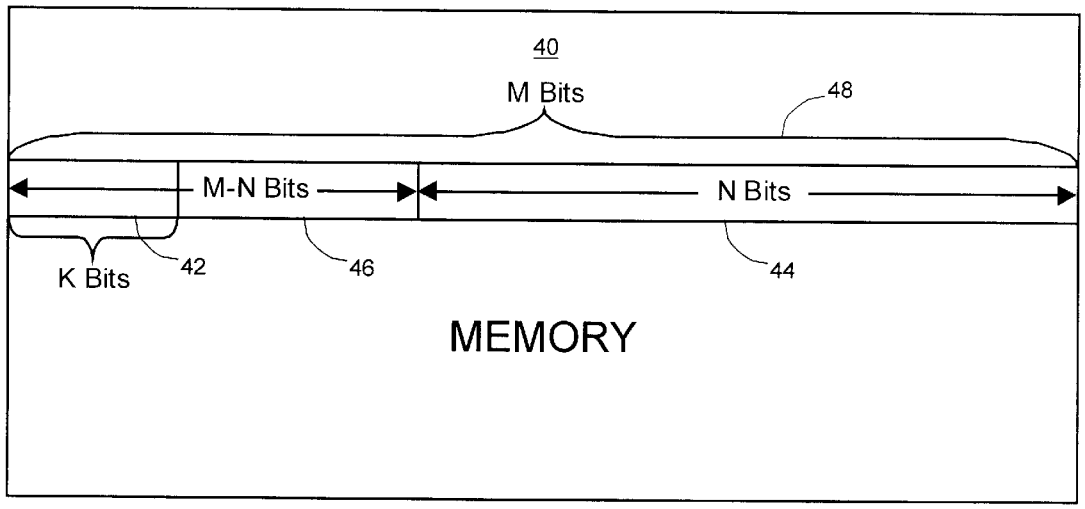
FIG. 2 is a block diagram that illustrates storing target words in host words, when the host words contain more bits than the target words, in accordance with the present invention.

FIG. 2 is a block diagram that illustrates storing target words in host words, when the host words contain more bits than the target words. Each host word 48 is stored in a memory 40. The memory may be the host memory 24, the L1 cache 14, the L2 cache 22 of an executing microprocessor 12, a register within the executing microprocessor 12, or in peripheral memory, such as on the target disk drive 38. Each host word 48 contains "M" bits. In the preferred embodiment, "M" is equal to 64, and is typical for microprocessors being introduced in the immediate future. The target system utilizes "N" bit words. For example, "N" is equal to 36 when emulating a GCOS 8 computer system from Bull HN Information Systems Inc., or a 2200 series computer system from Unisys Corporation. These In another example, PowerPC models 603 and 604 with "N" equal to 32 may be emulated on such a 64-bit Intel Itanium (IA-64) system. Each host word 48 can be divided into two parts: an "N" bit target word part 44, and a "M-N" bit portion 46 unused by emulated code in the target system.

The M-N high-order bits 46 are not directly used to emulate the target system. This is because the emulated target system utilizes the low order N-bits. The M-N high-order bits 46 are thus available for other uses in the emulation. Modification of some of these high order bits 42 can be expedited if M-N is greater than or equal to the system byte size, typically eight (8) bits. In such an instance, a K-bit subset 42 of the M-N high order bits 46 can typically be directly read and written to memory, with K being equal to a power of eight (i.e. 8, 16, 32), and with K being less than or equal to M-N. Thus, if M is equal to 64 and N is equal to 36, then K can be equal to either 8 or 16. The top order 8 or 16 bits can be directly written without the necessity of reading, masking, and writing that would be otherwise required.

The M-N high order bits 46 can be utilized for a number of different purposes when emulating a target system with a narrower word size than the emulating host system. One such use, discussed below, writes either a high order byte or half-word to memory and cache to force a specific cache line into cache. Another use is the gating and invalid bits used below.

One requirement for a tightly coupled multiprocessor system is support for atomic instructions. An atomic instruction is one that guarantees complete execution by one processor before another processor has a chance to intervene. In particular, tightly coupled multiprocessor systems require that atomic instructions be able to guarantee uninterrupted access to memory.

It is necessary to guarantee that emulated target system instructions have the same atomicity when emulated on a host system as when executed in native mode. In the prior art, this guarantee of atomicity has typically been accomplished by use of a memory lock over each section of target system memory. Each processor in a multiprocessor system will typically set the lock, read and/or update the memory, then clear the lock. At its simplest, a single lock is used to lock all of target memory. This has the problem that each lock potentially interferes with each other processor, regardless of what target memory is being accessed. This can be optimized by using a number of locks, with each of the locks being dedicated to a block of memory. This provides some relief. This can be later further refined by dedicating a lock for each word of target memory. This still however requires significant processor locking and unlocking overhead. It also requires memory space for the locks themselves.

A much more efficient mechanism is utilized in the present invention. An exchange-store instruction is executed on the host system to atomically update target memory. Some examples of such an exchange-store instruction are the Compare and Exchange instructions available in the Intel Pentium class (IA-32) and Itanium (IA-64) class architectures. In a preferred embodiment in the host Intel IA-64 architecture, a "cmpxchg8" or Compare and Exchange 8 byte instruction is utilized as the Compare and Exchange instruction to guarantee target system atomicity. In an alternate embodiment in the host IA-32 class architecture, a "CMPXCHG8B" or Compare and Exchange 8 Byte instruction is utilized as the Compare and Exchange instruction to guarantee target system atomicity. By employing the compare-and-exchange instruction for each memory update, a minimum level of multiprocessor lock contention is achieved with no explicit allocation of memory.

Figure 3:
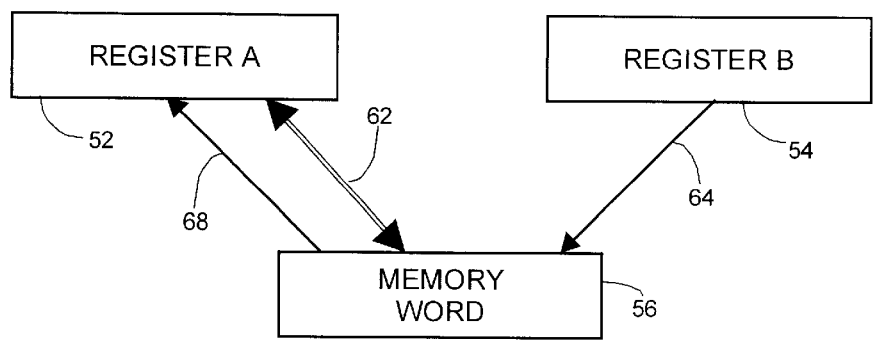
FIG. 3 is a block diagram and FIG. 4 is a flowchart that together illustrate operation of a Compare and Exchange type of instruction.
Figure 4:
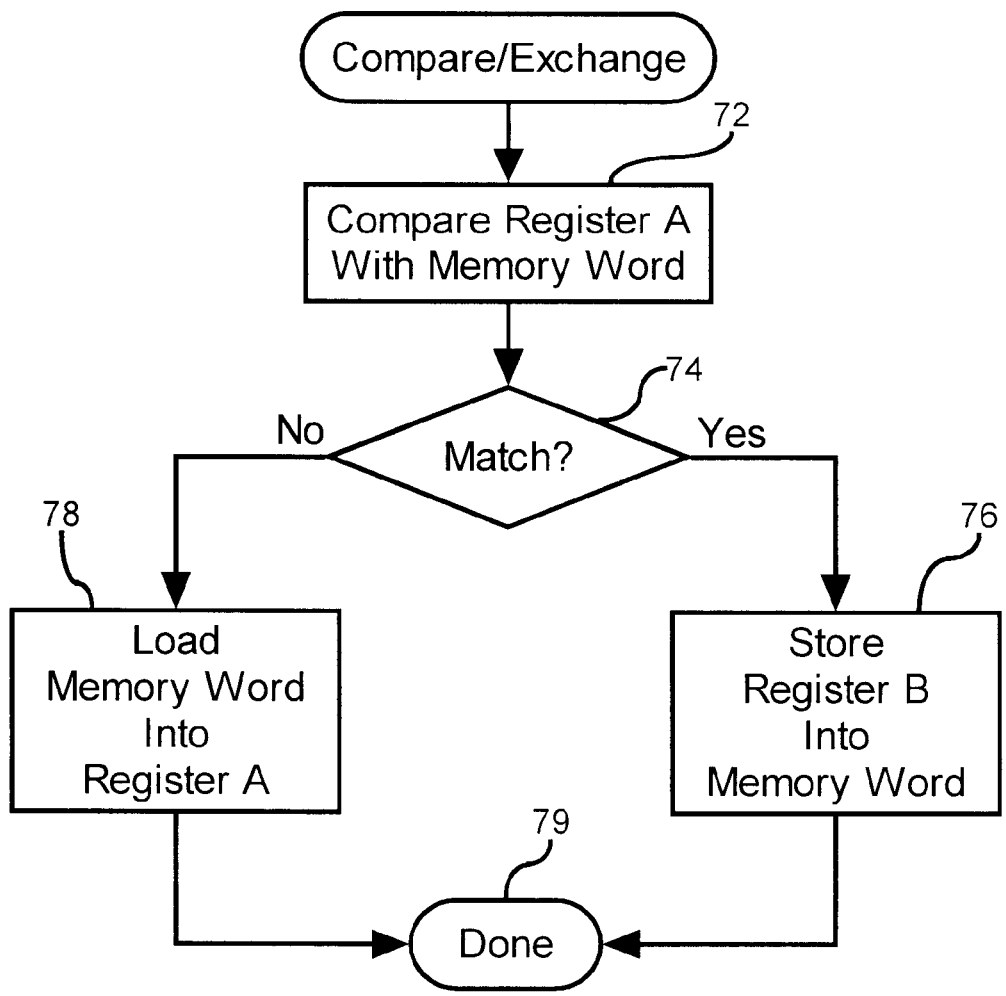

FIG. 3 is a block diagram that illustrates operation of a Compare and Exchange type of instruction. FIG. 4 is a flowchart that illustrates operation of a Compare and Exchange type of instruction. A value in a first register (Register A) 52 is compared 62 with a word in memory 56, step 72. If the word in memory 56 matches 62 the word in Register A 52, step 74, the contents of a second register (Register B) 54 are written 64 to the memory word 56 in the same uninterrupted single memory cycle, step 76. If the contents of the memory word 56 do not match the contents of Register A 52, step 74, the contents of the memory word 56 are written 68 into that Register A 52, step 78. In the case of the CMPXCHG8B instruction referenced above, a ZF flag in a status register is set if the word in memory 56 matches 62 the word in register A 52, and is cleared if the word in memory 56 does not match 62 the word in register A 52. This flag may be used by subsequent conditional branch instructions.

Figure 5:
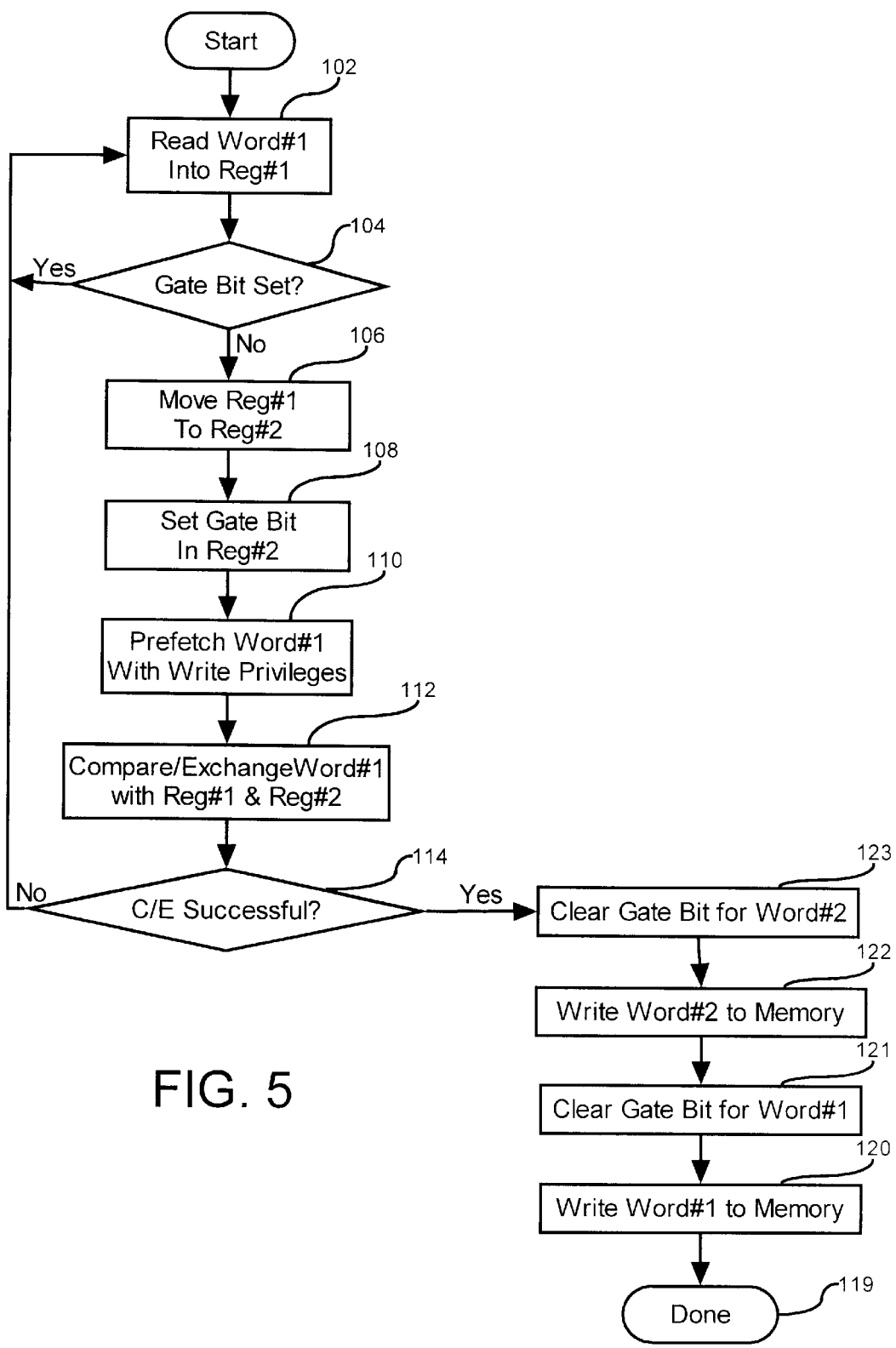
FIG. 5 is a block diagram illustrating atomic two word writes in a data processing system supporting atomic single word writes, in accordance with a preferred embodiment of the present invention.

FIG. 5 is a block diagram illustrating atomic two word writes in a data processing system supporting atomic single word writes, in accordance with a preferred embodiment of the present invention. The method starts by entering a loop. The first word (Word#1) to be written is read into a first register (Reg#1), step 102. A gating bit is tested, step 104. In the preferred embodiment, the gating bit is an otherwise unused bit in the word being read and written. However, in an alternate embodiment, gating bits are stored separately from the corresponding data words, for example in a byte array where the byte index into the byte array corresponds to a word address for the word being read and written. In the preferred embodiment, the gating bit being set indicates that the gate is closed, and the gating bit being clear indicates that the gate is open. However, in an alternate embodiment, the meaning of the gating bit is reversed.

In the preferred embodiment, with the gating bit occupying an otherwise unused bit in the word being read and written, the testing of the gating bit is done by testing the register just read. However, in an alternate embodiment, with gating bits being stored separately from data words, the bit stored separately is tested. In either case, if the gate bit is found in a locked position, step 104, the loop is repeated, starting with rereading the first word, step 102. Otherwise, the first register is moved to a second register (Reg#2), step 106. The gating bit is then set in the second register, step 108. Optionally, the first word (Word#1) is then prefetched with write privileges, step 110. In the preferred embodiment, where target words are stored in longer host words, this can be done by storing into an unused byte 42 (see FIG. 2) of that word. Then, a compare/exchange is performed for the first word (Word#1), step 112 utilizing the first (Reg#1) and second registers (Reg#2). In this step, the contents of the first word (Word#1) are read from memory and compared to the first register (Reg#1). If they match, atomically, the contents of the second register (Reg#2) are written to the specified location in memory. In a typical compare/exchange instruction, the previous contents of the memory location are left in the first register (see FIGS. 3 and 4). The success of the compare/exchange is then tested, step 114, and if it failed, the loop is repeated, starting at the read of the first word (word#1) from memory into the first register (Reg#1), step 102. Note that since the first register (Reg#1) received the contents of that memory location (Word#1) in the execution of the compare/exchange instruction in the previous step 112, the read of that word (Word#1) from memory, step 102, can be skipped, with the loop starting at the test of the gating bit in step 104.

If the compare/exchange was successful, step 114, the gate bit is set for that first word (Word#1). In that case, the gating bit for the next word in memory (Word#2) is cleared in the word to be written to that second word (Word#2), step 123, and that word is written to memory, step 122. This is followed by clearing the gating bit for the first word (Word#1), step 121, and writing it to memory, step 120. The method then exits, step 119. In the preferred embodiment, with the gating bit occupying an otherwise unused bit 46 in each target word in host memory, the gating bit is cleared in steps 123 and 121 by clearing such, if necessary, in the registers containing the future contents of the two words being written. Then, when these registers containing the future contents of these two words are written (in reverse order), steps 122, 120, to the two words in memory, the gating bits are cleared as a function of those writes 122, 120. However, in the above disclosed alternate embodiment, steps 123 and 122 should be reversed, as should steps 121 and 120, with the clearing of the gate bits in memory, steps 123, 121, following the corresponding writes of target words to host memory, steps 122, 120.

In the preferred embodiment of this invention, the gating bit set indicates that the gate is closed and the gated memory is logically inaccessible to procedures other than the procedure that entered and shut the gate. In an alternate embodiment of this invention, a second bit is utilized to indicate whether the gated memory content is invalid to procedures other than the procedure that entered and shut the gate. The second bit is set when the memory is being gated for update and is reset when the memory is being gated for read (to prevent concurrent update). The second bit being set indicates that the gated memory content is invalid to procedures other than the procedure that entered and shut the gate. Both bits are cleared when the writing is complete. The alternate embodiment allows concurrent emulated single word reads of memory to occur while the same memory is gated by an emulated atomic double word or multi word read.

Figures 6, 7:
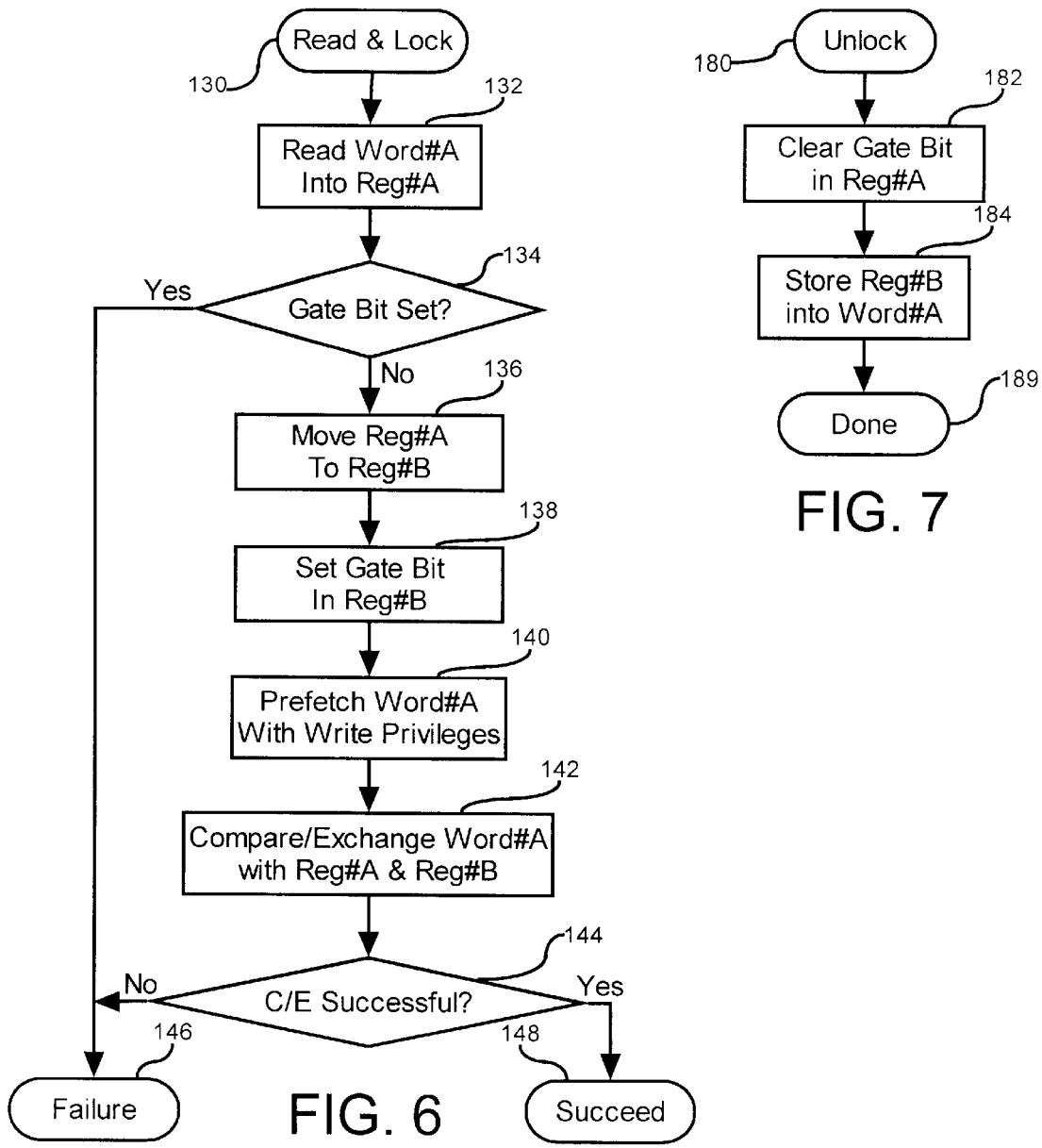
FIG. 6 is a block diagram of a Read and Lock function, in accordance with the preferred embodiment.
FIG. 7 is a block diagram of a Write and Unlock function, in accordance with the preferred embodiment.

FIG. 6 is a block diagram of a Read and Lock function 130, in accordance with the preferred embodiment. This Read and Lock function 130 can be seen as the functionality in steps 102, 104, 106, 108, 110, 112, and 114 of the previous FIG. This functionality is abstracted here since it will be used repeatedly in succeeding FIGs. It should be noted however that the typical implementation would expand this in-line for purposes of efficiency, with some overlapping of these steps with other steps for purposes of pipelining.

The Read and Lock function 130 has essentially three parameters or arguments, the two registers to be used (Reg#A and Reg#B) and the word to which it will be written (Word#A). The word to be written (Word#A) is read into a first register (Reg#A), step 132. The gating bit is tested, step 134. If the gating bit is set, indicating that another processor is attempting to write this word, the function exits indicating failure, step 146. Otherwise, the first register (Reg#A) is moved to a second register (Reg#B), step 136. The gating bit is then set in the second register, step 138. Optionally, the word (Word#A) is then prefetched with write privileges, step 140. Then, a compare/exchange (see FIGS. 3 and 4 above) is performed for the word to be written (Word#A), step 142 utilizing the first (Reg#A) and second (Reg#B) registers. In this step, the contents of the first word (Word#A) are read from memory and compared to the first register (Reg#A). If they match, atomically, the contents of the second register (Reg#B) are written to the specified location in memory (Word#A). In a typical compare/exchange instruction, the previous contents of the memory location are left in the first register (Reg#A). The success of the compare/exchange is then tested, step 144, and if it failed, the function exits indicating failure, step 146. Otherwise, the function exits indicating success, step 148.

FIG. 7 is a block diagram of a Write and Unlock function 180, in accordance with the preferred embodiment. This Write and Unlock function 180 can be seen as the functionality in steps 120 and 121, and 122 and 123 FIG. 5. This functionality is abstracted here since it will be used repeatedly in succeeding FIGs. It should be noted however that the typical implementation would expand this in-line for purposes of efficiency, with some overlapping of these steps with other steps for purposes of pipelining.

The Write and Unlock function 180 has essentially two parameters or arguments, the register to be written (Reg#A) and the word to which it will be written (Word#A). It starts by clearing the gate bit in the register (Reg#A) to be written, step 182. It then writes this register (Reg#A) to the specified location in memory (Word#A), step 184. The function is then complete, step 189. As noted above, in the case of an alternate embodiment where the gate bit is stored separately from the target data words, the order of the above two steps 182, 184, would preferably be reversed. Also note that in the case where the gate flag for a word is being unlocked without writing the new contents to the word in memory, in the preferred embodiment this can be done by simply writing the register that received the contents of the word in memory back to that location in memory.

Figure 8:
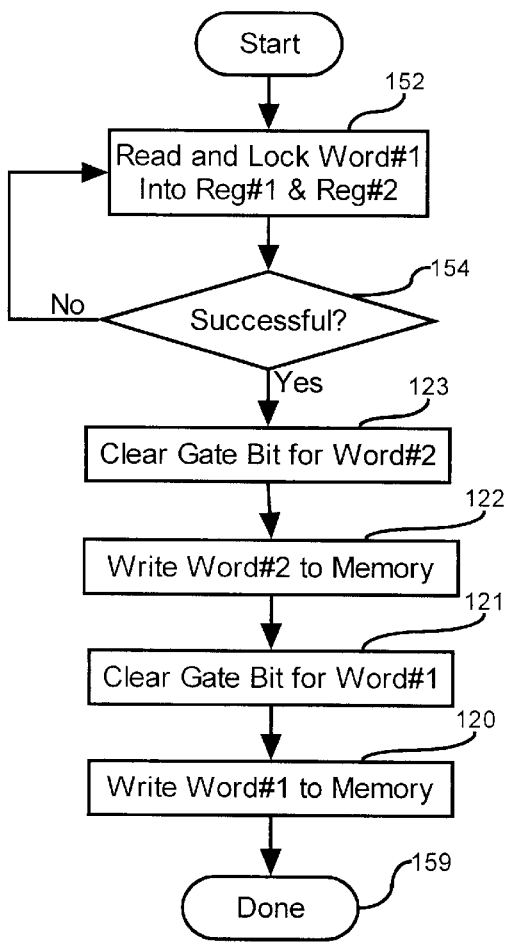
FIG. 8 is a block diagram illustrating atomic two word writes in a data processing system supporting atomic single word writes, in accordance with a preferred embodiment of the present invention.

FIG. 8 is a block diagram illustrating atomic two word writes in a data processing system supporting atomic single word writes, in accordance with a preferred embodiment of the present invention. It is identical to FIG. 5, except that the Read and Lock function 130, is shown as step 152, instead of steps 102, 104, 106, 108, 110, 112, and 114.

Figure 9:
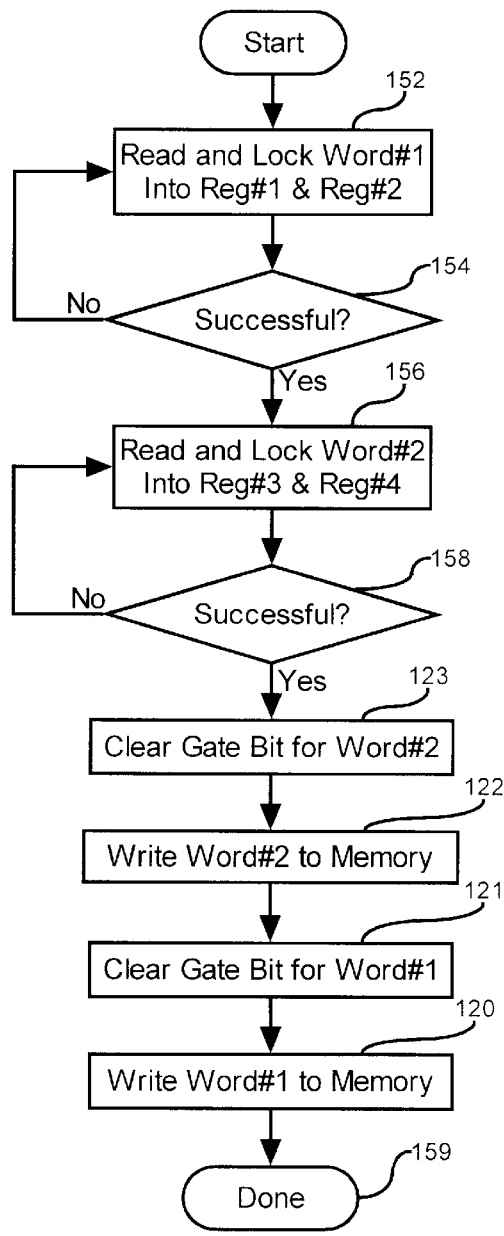
FIG. 9 is a block diagram illustrating atomic two word writes in a data processing system supporting atomic single word writes, in accordance with an alternate embodiment of the present invention.

FIG. 9 is a block diagram illustrating atomic two word writes in a data processing system supporting atomic single word writes, in accordance with an alternate embodiment of the present invention. It is similar to FIG. 8, except that both words to be written are gated or locked. It starts by entering a first loop, which begins by trying to Read and Lock 130 the first word (Word#1) into two registers (Reg#1, Reg#2), step 152. If not successful, step 154, the loop is repeated. Otherwise, enters a second loop, starting by trying to Read and Lock 130 the second word (Word#2) into two registers (Reg#3, Reg#4), step 156. If not successful, step 158, the second loop is repeated. When both words have their gate bit set, steps 152, 156, the two words are written to memory, steps 122, 120, and the two gate bits are cleared, steps 123, 121, as in FIGS. 5 and 8. The method is then complete, step 159.

First note that all of the methods shown here for atomic reading and writing of multiple words implicitly require that gates be set in a specified order. This is accomplished in the preferred embodiment by setting such gates for words in increasing address order. Alternatively, it could be done utilizing the reverse order.

Secondly, the preferred embodiment in FIGS. 5 and 8 only set the gate lock for the first of the two words to be stored. The setting of the gate lock for the second word in the alternate embodiment in FIG. 9 is only required if the words being written are either not contiguous, or are not double word aligned.

Figure 10:
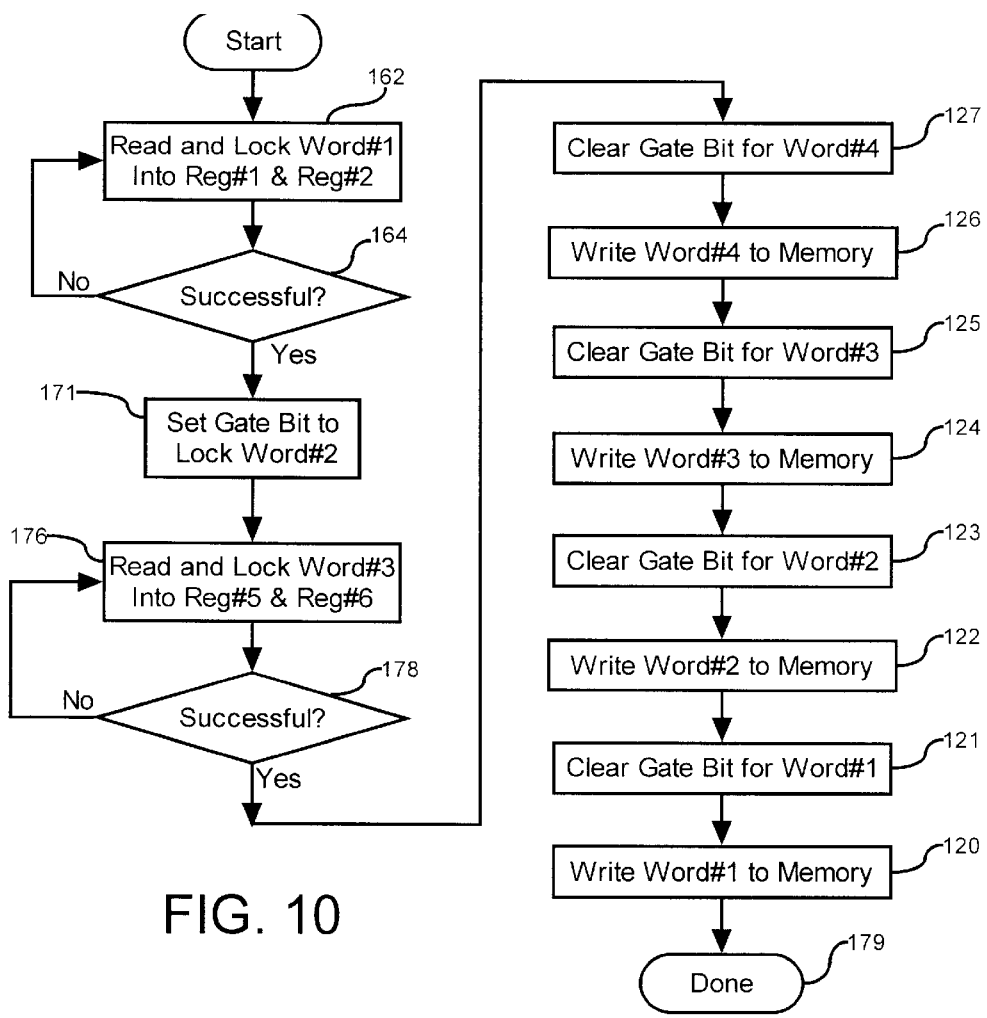
FIG. 10 is a block diagram illustrating atomic four word writes in a data processing system not supporting atomic multiple word writes, in accordance with a preferred embodiment of the present invention.

FIG. 10 is a block diagram illustrating atomic four word writes in a data processing system not supporting atomic multiple word writes, in accordance with a preferred embodiment of the present invention. It is similar to FIG. 8 except that the first and third words are locked by setting the corresponding gating bits utilizing the Read and Lock functionality 130 disclosed above, the second word is locked by setting the gate bit, and the four words are stored and their gating bits cleared in reverse order.

The method starts by entering a first loop which starts by trying to read and lock 130 the first word (Word#1) to be written utilizing two registers (Reg#1, Reg#2), step 162. If this is not successful, step 164, the loop repeats, starting again with trying to read and lock 130 the first word (Word#1), step 162. Otherwise, the gate bit for the second word (Word#2) is locked, step 171. Then, a second loop is entered which starts by trying to read and lock 130 the third word (Word#3) to be written utilizing two registers (Reg#5, Reg#6), step 176. If this is not successful, step 178, the loop repeats, starting again with trying to read and lock 130 the third word (Word#3), step 176. In the case of writing more than four words, the above is repeated for all except the last word to be written, leaving all of the words, except the last, with the gate bit locked.

When all of the words to be written have their gate bit locked except for the last word to be written, the four words are written to memory in reverse order, along with clearing the corresponding gate bits. First, the gate bit for Word#4 is cleared, step 127 and that word is written to memory, step 126. Then the gate bit for Word#3 is cleared, step 125 and that word is written to memory, step 124. Then the gate bit for Word#2 is cleared, step 123 and that word is written to memory, step 122. Then the gate bit for Word#1 is cleared, step 121 and that word is written to memory, step 120. The method is then complete, step 179. As with locking with the gate bits, this methodology is easily expanded for more than four words, unlocking and writing them in reverse order to memory.

In an alternate embodiment, instead of three loops, there is one loop. Whenever an attempt to read and lock 130, steps 162, 172, 176, a word to be written to memory fails 164, 174, 178, all of the preceding words are unlocked 180 and the loop repeats from the top, attempting to Read and Lock Word#1, step 162.

In a second alternate embodiment, after the third (or second to last) word is locked by having its gating bit set, the last word is read from memory. Its gating bit is tested, and if set, the read is repeated. Otherwise, the write to memory utilizes a compare/exchange instruction to make sure that the word has not been changed since it was just read. If the compare/exchange instruction is successful, it writes the new contents to word#4, step 126. Otherwise, the word read by the compare/exchange instruction has its gating bit tested. This loop is repeated until the new contents for that last word can be successfully written to memory at a time when the gating bit for that word is clear or unlocked.

Figure 11:
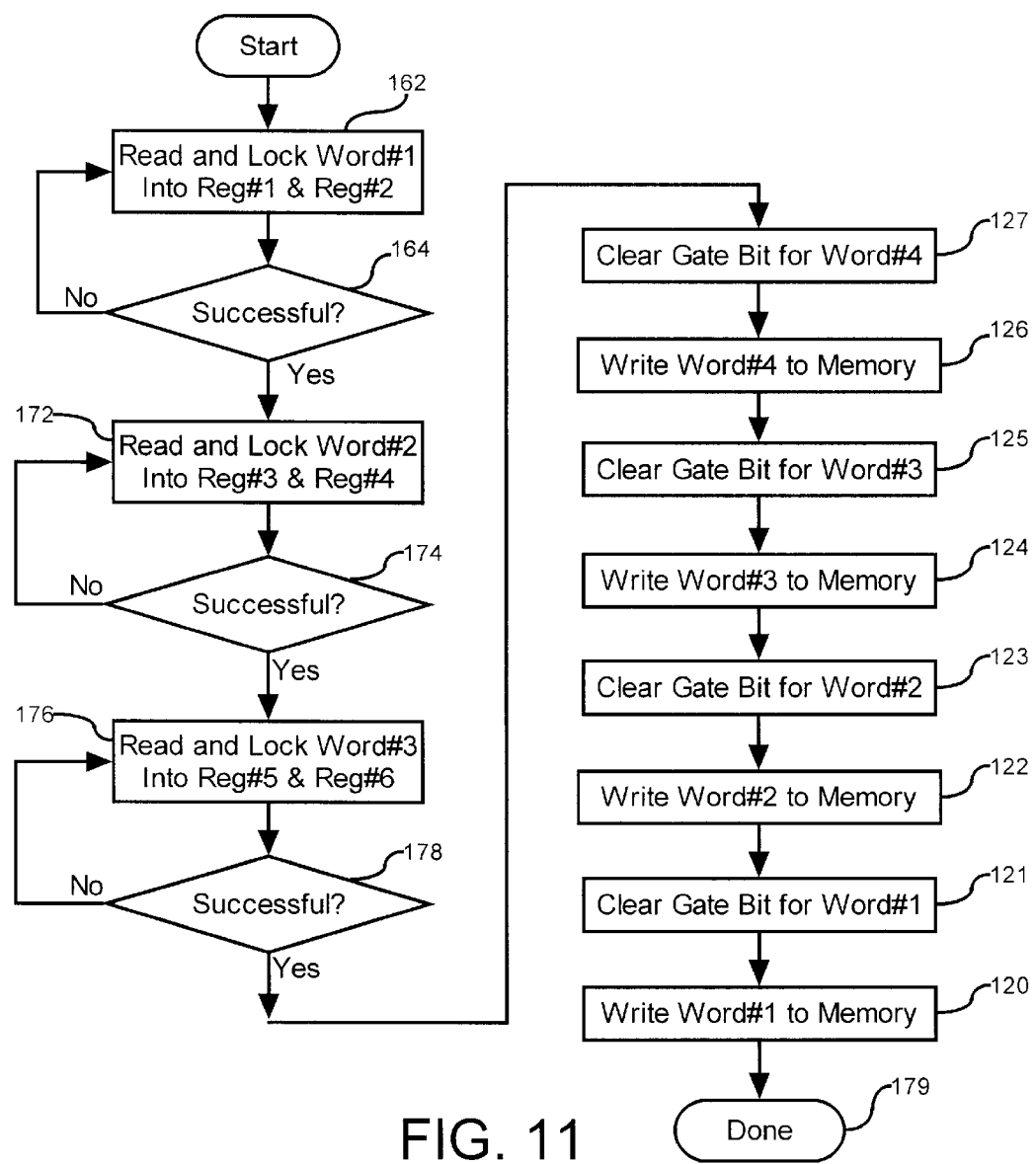
FIG. 11 is a block diagram illustrating atomic four word writes in a data processing system not supporting atomic multiple word writes, in accordance with an alternate embodiment of the present invention.

FIG. 11 is a block diagram illustrating atomic four word writes in a data processing system not supporting atomic multiple word writes, in accordance with an alternate embodiment of the present invention. It is similar to FIG. 8 except that the first, second, and third words are locked by setting the gating bit and the four words are stored and their gating bits cleared in reverse order.

The method starts by entering a first loop which starts by trying to read and lock 130 the first word (Word#1) to be written utilizing two registers (Reg#1, Reg#2), step 162. If this is not successful, step 164, the loop repeats, starting again with trying to read and lock 130 the first word (Word#1), step 162. Otherwise, a second loop is entered which starts by trying to read and lock 130 the second word (Word#2) to be written utilizing two registers (Reg#3, Reg#4), step 172. If this is not successful, step 174, the loop repeats, starting again with trying to read and lock 130 the second word (Word#2), step 172. Otherwise, a third loop is entered which starts by trying to read and lock 130 the third word (Word#3) to be written utilizing two registers (Reg#5, Reg#6), step 176. If this is not successful, step 178, the loop repeats, starting again with trying to read and lock 130 the third word (Word#3), step 176. In the case of writing more than four words, the above is repeated for all except the last word to be written, leaving all of the words, except the last, with the gate bit set.

When all of the words to be written have their gate bit locked except for the last word to be written, the four words are written to memory in reverse order, along with clearing the corresponding gate bits. First, the gate bit for Word#4 is cleared, step 127 and that word is written to memory, step 126. Then the gate bit for Word#3 is cleared, step 125 and that word is written to memory, step 124. Then the gate bit for Word#2 is cleared, step 123 and that word is written to memory, step 122. Then the gate bit for Word#1 is cleared, step 121 and that word is written to memory, step 120. The method is then complete, step 179. As with locking with the gate bits, this methodology is easily expanded for more than four words, unlocking and writing them in reverse order to memory.

Several methods of atomically writing to four words in memory are shown above. These methods can be easily extended to larger numbers of words in the manner that the two word atomic write methods were extended to handle four words.

Figure 12:
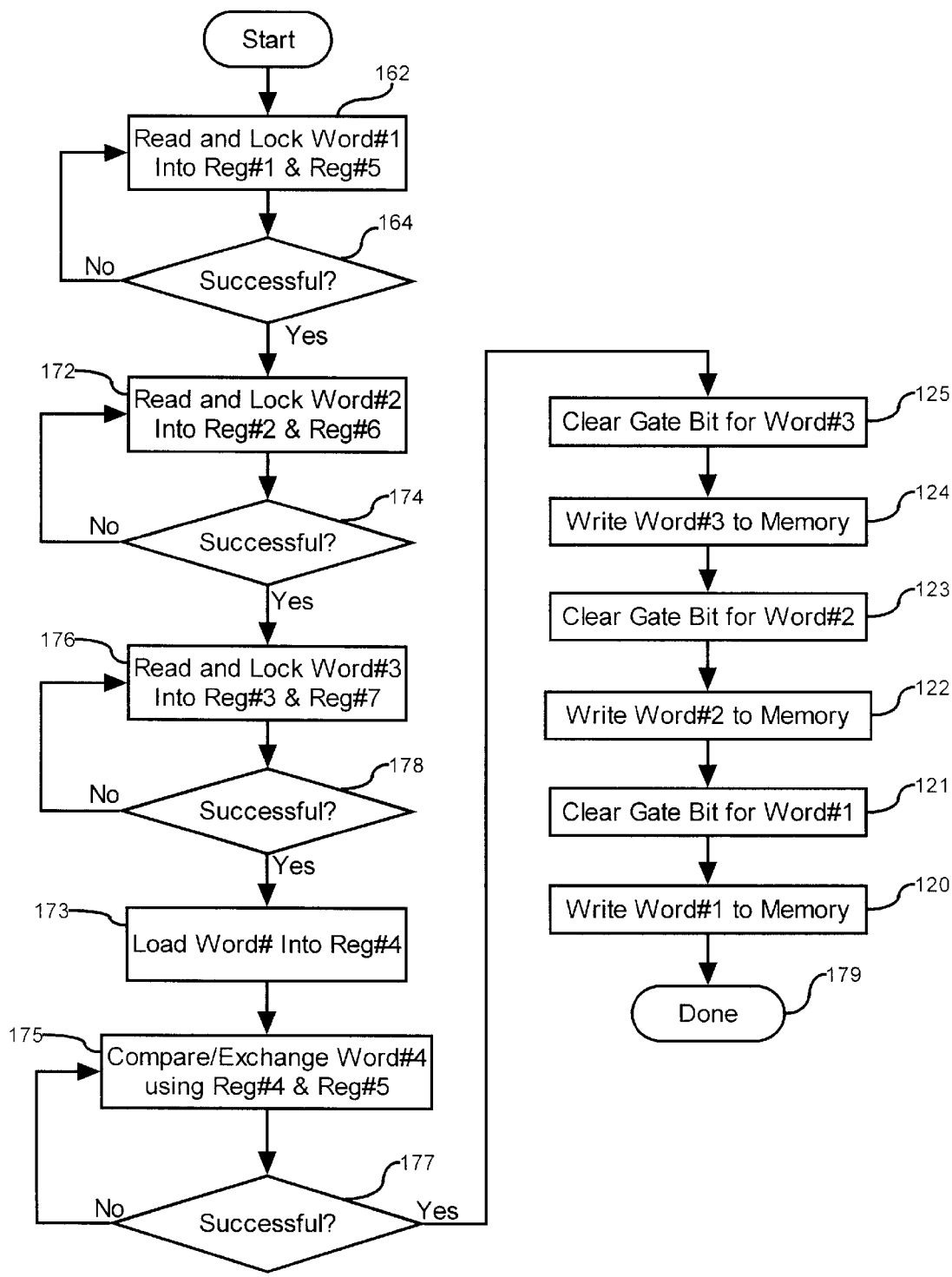
FIG. 12 is a block diagram illustrating atomic four word read/alter/rewrite in a data processing system not supporting atomic multiple word writes, in accordance with a preferred embodiment of the present invention.

FIG. 12 is a block diagram illustrating atomic four word read/alter/rewrite in a data processing system not supporting atomic multiple word writes, in accordance with a preferred embodiment of the present invention.

The method starts by entering a first loop which starts by trying to read and lock 130 the first word (Word#1) to be written utilizing two registers (Reg#1, Reg#5), step 162. If this is not successful, step 164, the loop repeats, starting again with trying to read and lock 130 the first word (Word#1), step 162. Otherwise, a second loop is entered which starts by trying to read and lock 130 the second word (Word#2) to be written utilizing two registers (Reg#2, Reg#6), step 172. If this is not successful, step 174, the loop repeats, starting again with trying to read and lock 130 the second word (Word#2), step 172. Otherwise, a third loop is entered which starts by trying to read and lock 130 the third word (Word#3) to be written utilizing two registers (Reg#3, Reg#7), step 176. If this is not successful, step 178, the loop repeats, starting again with trying to read and lock 130 the third word (Word#3), step 176. In the case of writing more than four words, the above is repeated for all except the last word to be written, leaving all of the words, except the last, with the gate bit set. The fourth (or last) word (Word#4) is then read into a fourth register (Reg#4), step 173. It is altered as required (not shown), then read back to memory using a compare/exchange instruction, step 175, to atomically read/alter/rewrite the word in memory utilizing the fourth (Reg#4) and a fifth register (Reg#5). This is repeated, step 177, until successful. At this point, the contents of the four words (Word#1, Word#2, Word#3, Word#4) are in four registers (Reg#1, Reg#2, Reg#3, Reg#4), and the gate bit is locked for all except the last word (Word#4).

When all of the words to be written have their gate bit locked except for the last word to be written, the first three words are written to memory in reverse order, along with clearing the corresponding gate bits. First, the gate bit for Word#3 is cleared, step 125 and that word is written to memory, step 124. Then the gate bit for Word#2 is cleared, step 123 and that word is written to memory, step 122. Then the gate bit for Word#1 is cleared, step 121 and that word is written to memory, step 120. The method is then complete, step 179. As with locking with the gate bits, this methodology is easily expanded for more than four words, unlocking and writing them in reverse order to memory.

Figure 13:
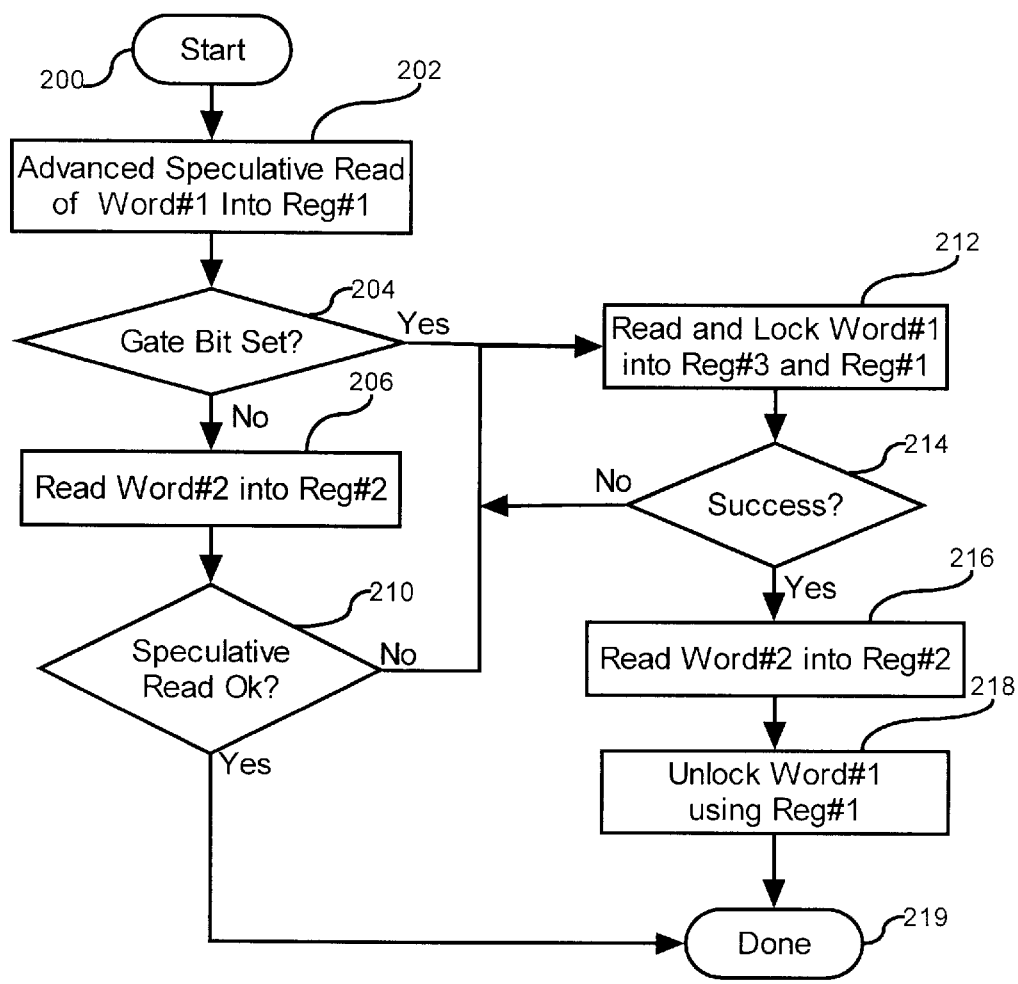
FIG. 13 is a flowchart illustrating atomic two word reads in a data processing system not supporting atomic two word writes, in accordance with a preferred embodiment of the present invention.

FIG. 13 is a flowchart illustrating atomic two word reads in a data processing system not supporting atomic two word writes, in accordance with a preferred embodiment of the present invention. The method starts by executing an advanced speculative read of the first word (Word#1) to be read from memory into a first register (Reg#1), step 202. The gating bit is then tested for this word, step 204. If the gating bit is not locked, step 204, the second word (Word#2) is read from memory into a second register (Reg#2), step 206. The speculative read in step 202 is then checked, step 210. In the preferred embodiment, this is done by execution of an IA-64 check speculation instruction. If the speculative read was successful, step 210, the method is complete, step 219, with the first word (Word#1) from memory in the first register (Reg#1), and the second word (Word#2) from memory in the second register (Reg#2). In an alternate embodiment, the gating bit for the second word (Word#2) is also checked.

Otherwise, if either gating bit is locked, steps 204, 208, or the speculative read failed, step 210, the first word (Word#1) is Read and Locked 130 utilizing the first register (Reg#1) and a third register (Reg#3), step 212. If the Read and Lock 130 is not successful, step 214, the Read and Lock 130, step 212, is repeated. When this loop finally exits, the contents of the word in memory, before being locked, reside in the first register (Reg#1). The second word (Word#2) is then read from memory into the second register (Reg#2), step 216. The first word (Word#1) is then unlocked by storing the first register (Reg#1) back into that location in memory, step 218. At this point, the method is now complete, step 219, again with the first word (Word#1) from memory in the first register (Reg#1), and the second word (Word#2) from memory in the second register (Reg#2).

The advanced speculative read, step 202, utilized here is a feature introduced by Intel into its new IA-64 architecture. When a speculative load is executed, an entry is allocated in a hardware structure called the Advanced Load Address Table (ALAT). The ALAT is indexed by physical register number and records the load address, load type, and the size of the load. A check instruction (step 210) must then be executed before the result of an advanced load can be used by any non-speculative instruction.

When a check instruction is executed, the ALAT is searched for an entry with the same target physical register number and type. If an entry is found, execution continues normally with the next instruction. If an entry is not found, the speculative results need to be recomputed. There are a number of reasons that an advanced speculative load may fail. Most notably for this invention, the advanced speculative load will fail if another processor has caused the corresponding cache line containing the target of the load to be invalidated through updating it. Thus, the advanced speculative load instruction will fail, and the check speculation instruction will branch, when the memory block containing the target word is modified by another processor. This provides an efficient mechanism to detect modification of memory at or near the target word to be read by another processor.

Figure 14:
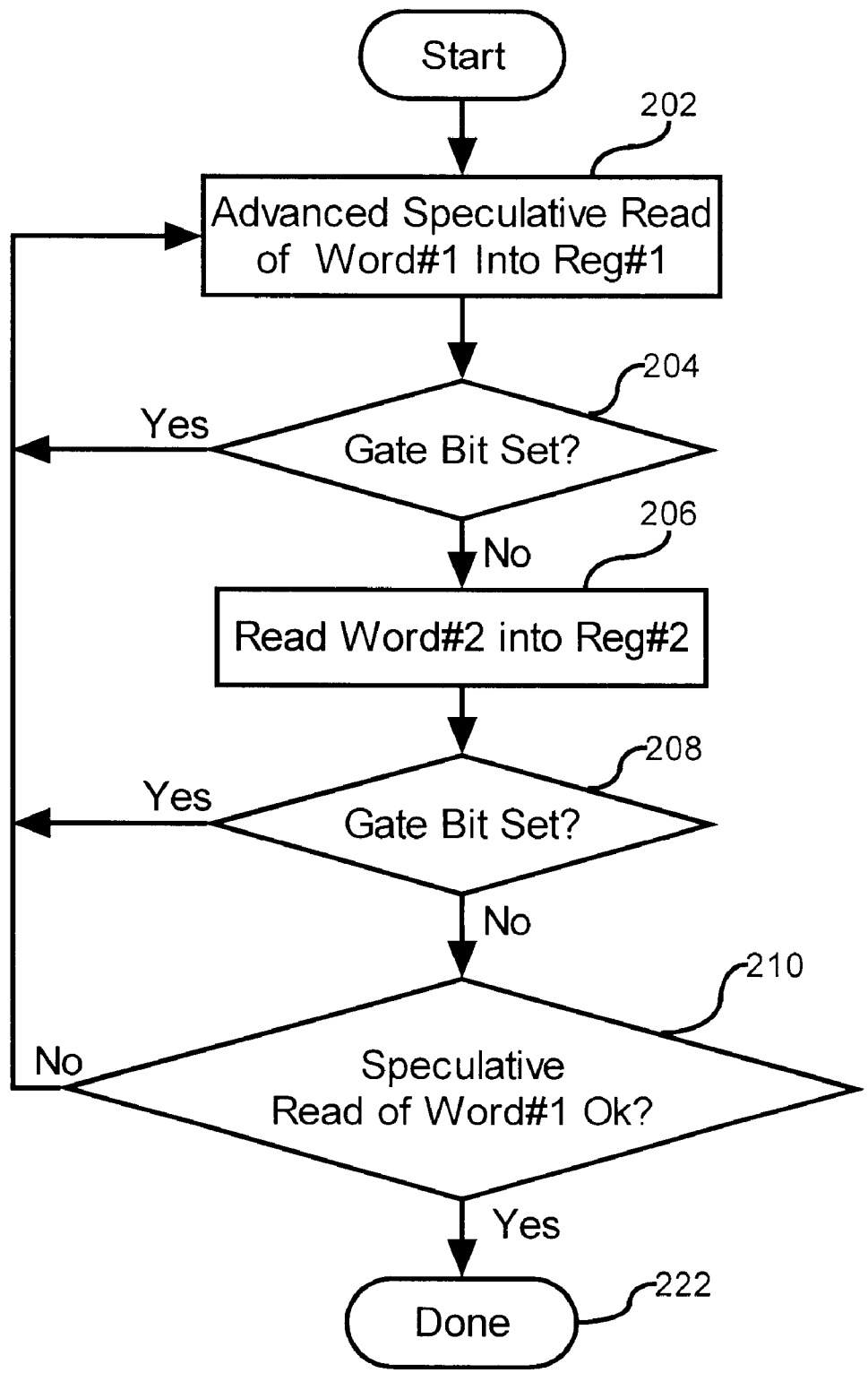
FIG. 14 is a flowchart illustrating atomic two word reads in a data processing system not supporting atomic multiple word reads, in accordance with a first alternate embodiment of the present invention.

FIG. 14 is a flowchart illustrating atomic two word reads in a data processing system not supporting atomic multiple word reads, in accordance with a first alternate embodiment of the present invention. It differs from the method in the previous FIG. in that instead of locking and unlocking the first word (Word#1) to be read from memory in case of failures, steps 204, 208, 210, this embodiment loops on the advanced speculative read, step 202, until all tests succeed.

This embodiment starts by utilizing an advanced speculative load to load the first word (Word#1) into the first register, step 202. The gate bit is then tested for that word, step 204. If the gate bit is locked, step 204, the method loops, starting again at the advanced speculative load, step 202. Otherwise, the second word (Word#2) is read from memory into a second register (Reg#2), step 206. The gate bit is then tested for that word, step 208, and if set, the method then loops, starting again at the advanced speculative load, step 202. Otherwise, the advanced speculative load is then checked, step 210, and if it failed, the method again loops, starting again at the advanced speculative load, step 202. Otherwise, it is complete, step 222, with the first word (Word#1) from memory in the first register (Reg#1), and the second word (Word#2) from memory in the second register (Reg#2).

This alternate embodiment has a couple of benefits over the preferred embodiment. Most notably, it never performs writes to memory. Thus, it is not necessary to get ownership or write access to the block(s) of memory containing the words being read. However, Intel has apparently currently not implemented the advanced speculative load and the speculative check instructions as they were originally described in Intel documentation for the IA-64 architecture. One problem with the current implementation is that a trap or fault is taken to the operating system every time that an advanced speculative read fails. Such faults are expensive in terms of processor cycles, which is why the preferred embodiment switches to locking the first word (Word#1) to be read when the advanced speculative load fails.

These atomic multiple word reads disclosed above are shown reading two words from memory. They can be easily expanded by a person reasonably skilled in the art to atomically read more than two words.

Figure 15:
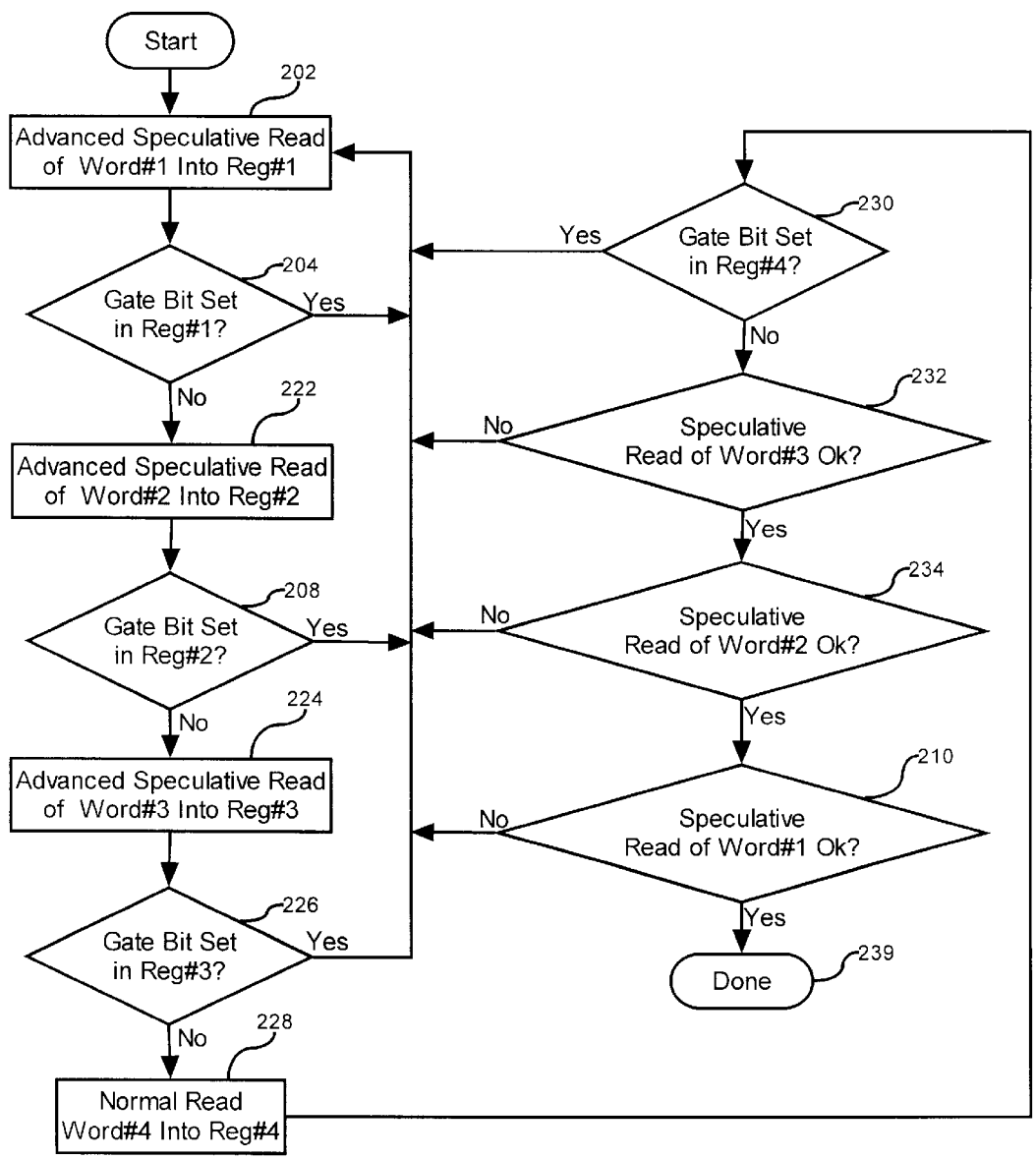
FIG. 15 is a flowchart illustrating atomic four word reads in a data processing system not supporting atomic multiple word reads, in accordance with a preferred embodiment of the present invention.

FIG. 15 is a flowchart illustrating atomic four word reads in a data processing system not supporting atomic multiple word reads, in accordance with a preferred embodiment of the present invention. It is similar to the previous FIGs. except that an advanced speculative load is utilized to read all except the fourth (or last) word. It starts by performing an advanced speculative load of the first word (Word#1) into a first register, step 202. The gating bit is then checked for this word, step 204, and if locked, the method loops, starting again with the advanced speculative load of the first word (Word#1), step 202. Otherwise, an advanced speculative load of the second word (Word#2) into a second register (Reg#2) is performed, step 222. The gating bit for that word is tested, step 208, and if locked, the method loops, starting with the advanced speculative load of the first word (Word#1), step 202. Otherwise, an advanced speculative load of the third word (Word#3) into a third register (Reg#3) is performed, step 224. The gating bit for that word is tested, step 226, and if locked, the method loops, starting with the with the advanced speculative load of the first word (Word#1), step 202. Otherwise, the fourth (or last) word (Word#4) is read into a fourth register (Reg#4), step 228. The gating bit for that word is tested, step 230, and if locked, the method loops, starting with the with the advanced speculative load of the first word (Word#1), step 202.

Otherwise, the third advanced speculative load is checked, step 232. This is followed by a check of the second advanced speculative load, step 234, and a check of the first advanced speculative load, step 210. If any of the advanced speculative loads has failed, the method loops, starting with the advanced speculative load of the first word (Word#1), step 202. Otherwise, it is complete, step 224, with the first word (Word#1) from memory in the first register (Reg#1), the second word (Word#2) from memory in the second register (Reg#2), the second word (Word#3) from memory in the second register (Reg#3), and the fourth word (Word#4) from memory in the fourth register (Reg#4).

In order for the above embodiments to successfully read and write multiple words atomically in a system that does not support multiple word writes, it is important that the corresponding single word reads and writes respect the conventions established. In particular, both should be blocked from completion as long as the gate bit for the word being read or written is locked. The following two FIGs. illustrate single word writes and reads that respect this convention.

Figure 16:
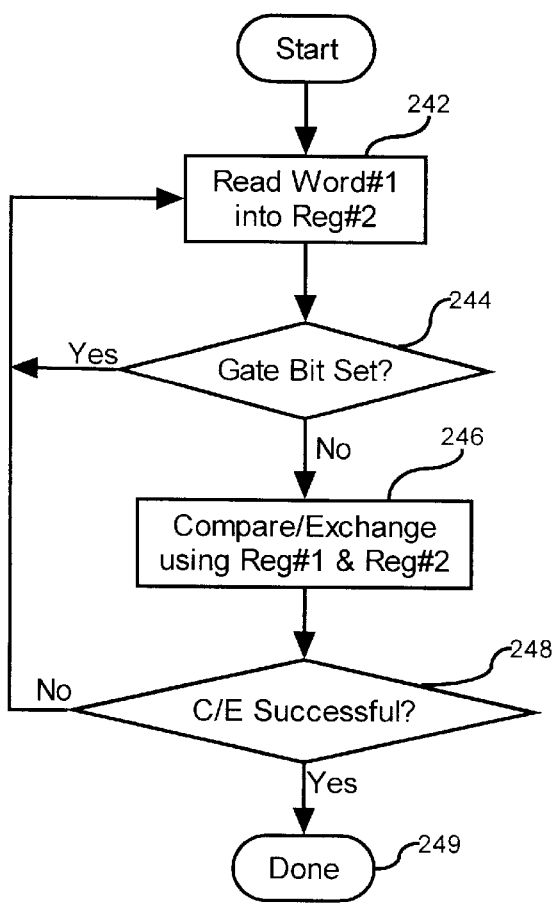
FIG. 16 is a flowchart illustrating single word writes in a data processing system not supporting atomic multiple word writes, in accordance with a preferred embodiment of the present invention.

FIG. 16 is a flowchart illustrating single word writes in a data processing system not supporting atomic multiple word writes, in accordance with a preferred embodiment of the present invention. The contents of a first register (Reg#1) are written to a specified location in memory (Word#1). A loop is entered and the contents of the specified location in memory (Word#1) are read into a second register (Reg#2), step 242. The gate bit is then tested, step 244. If the gate bit is locked, step 244, the loop repeats, starting at the read of the contents of the specified location (Word#1), step 242. Otherwise, a compare exchange instruction is executed, step 246, using two registers (Reg#2, Reg#1). In the compare/exchange instruction execution, the contents of the specified location in memory (Word#1) are atomically read and compared with the second register (Reg#2). If they match, the contents of the first register (Reg#1) are written to the specified location in memory (Word#1). The success of the compare/exchange instruction is tested, step 248, and if it failed, the loop is repeated, starting at the read of the contents of the specified location in memory, step 242. Otherwise, the method is done, step 249.

Figure 17:
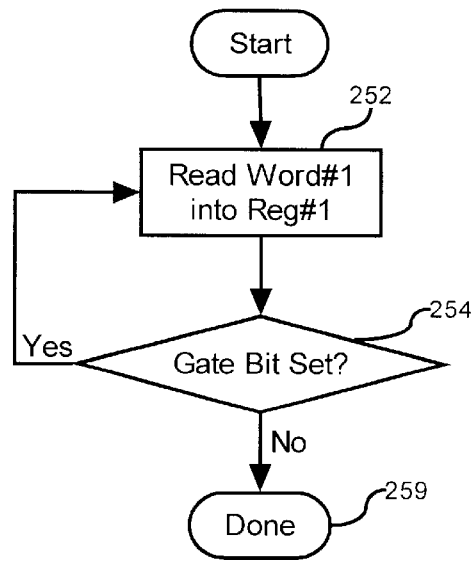
FIG. 17 is a flowchart illustrating single word reads in a data processing system not supporting atomic multiple word reads, in accordance with a preferred embodiment of the present invention.

FIG. 17 is a flowchart illustrating single word reads in a data processing system not supporting atomic multiple word reads, in accordance with a preferred embodiment of the present invention. The contents of a first register (Reg#1) are read from a specified location in memory (Word#1). A loop is entered and the contents of the location to be read (Word#1) are read into a first register (Reg#1), step 252. The gate bit is then tested, step 254. If the gate bit is locked, step 254, the loop repeats, starting at the read of the specified location in memory (Word#1), step 252. Otherwise, the method is done, step 259, with the contents of the specified word (Word#1) in the register (Reg#1).

The present invention provides atomic reading and writing of multiple words from memory when implemented in a host system that does not provide multiple word atomic reads and writes. This has a number of advantages, especially when emulating a target system that does support such multiple word atomic reads and writes. It allows the number of locks utilized to be reduced, since otherwise it would be necessary to lock multiple word reads and writes of shared memory. It also increases security when multiple word target security data is read or written, such as two word descriptors when emulating a GCOS 8 system.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and lettering in itself is not intended to and should not be taken to indicate the ordering of elements and/or steps in the claims.

What is claimed is:

1. A method of performing an atomic multiple word write to a memory for use in a processor that does not provide an atomic multiple word write to the memory capability, wherein said method comprises:

A) attempting to set a gate flag associated with a first location in the memory to a first state when in a second state;

B) testing whether the attempt in step (A) was successful;

C) repeating steps (A) and (B) if the testing in step (B) failed;

D) writing a second register to a second location in the memory after the test in step (B) succeeds;

E) writing a first register to the first location in the memory after writing the second register in step (D); and F) setting the gate flag associated with the first location in the memory to the second state after completing writing the second register to the second location in step (D) and not before completing writing the first register in step (E).

2. The method in claim 1 wherein:

the gate flag associated with the first location in the memory is an otherwise unused bit in the first location in the memory; and step (F) is accomplished in step (E) by storing the first register in the first location in the memory with the gate flag set to the second state.

3. The method in claim 1 wherein:

step (A) further comprises:
1) reading a location in the memory containing the gate flag associated with the first location in the memory into a third register;
2) testing whether the gate flag in the third register is in the second state; and
3) if the gate flag was tested in substep (2) to be in the second state, performing operations comprising:
   a) moving a contents of the third register to a fourth register;
   b) setting the gate flag to the first state in the fourth register; and
   c) atomically comparing the third register to a contents of the location in the memory containing the gate flag, and if the third register matches the contents of the location in the memory containing the gate flag, then writing the fourth register to the location in the memory containing the gate flag.

4. The method in claim 1 wherein:

step (A) further comprises:
1) reading a location in the memory containing the gate flag associated with the first location in the memory into a third register;
2) testing whether the gate flag in the third register is in the second state; and
3) if the gate flag was tested in substep (2) to be in the second state, performing operations comprising:
   a) moving a contents of the third register to a fourth register;
   b) setting the gate flag to the first state in the third register; and
   c) atomically comparing the fourth register to a contents of the location in the memory containing the gate flag, and if the fourth register matches the contents of the location in the memory containing the gate flag, then writing the third register to the location in the memory containing the gate flag.

5. The method in claim 1 which further comprises:

G) attempting to set a gate flag associated with a third location in the memory to the first state when in the second state after attempting to set the gate flag in step (A);
H) testing whether the attempt in step (G) was successful;
I) repeating steps (G) and (H) if the testing in step (H) failed;
J) writing a fourth register to a fourth location in the memory after the test in step (H) succeeds and before setting the gate flag in step (F);
K) writing a third register to the third location in the memory after the test in step (H) succeeds and before setting the gate flag in step (F); and
L) setting the gate flag associated with the third location in the memory to the second state after completing writing the fourth register to the fourth location in step (J) and not before completing writing the third register in step (K).

6. The method in claim 1 which further comprises:

G) attempting to set a gate flag associated with a third location in the memory to the first state when in the second state after attempting to set the gate flag in step (A);
H) testing whether the attempt in step (G) was successful;
I) setting the gate flag associated with the first location in the memory to the second state if the testing in step (H) failed;
J) repeating steps (A), (B), (C), (G), (H), and (I) if the testing in step (H) failed; and
K) writing a fourth register to a fourth location in the memory after the test in step (H) succeeds and before setting the gate flag in step (F);
L) writing a third register to the third location in the memory after the test in step (H) succeeds and before setting the gate flag in step (F); and
M) setting the gate flag associated with the third location in the memory to the second state after completing writing the fourth register to the fourth location in step (K) and not before completing writing the third register in step (L).

7. The method in claim 1 which further comprises:

G) attempting to set a gate flag associated with the second location in the memory to the first state when in the second state after the testing in step (B) is successful and before the writing in step (D);
H) testing whether the attempt in step (G) was successful;
I) setting the gate flag associated with the first location in the memory to a second state if the testing in step (H) failed;
J) repeating steps (A), (B), (C), (G), (H), and (I) if the testing in step (H) failed; and
F) setting the gate flag associated with the second location in the memory to the second state after completing writing the second register to the second location in step (D).

8. The method in claim 1 wherein:

the gate flag associated with the first location in the memory is an otherwise unused bit in the first location in the memory.

9. The method in claim 1 wherein:

the gate flag corresponding to the first location in the memory is a bit in an array in the memory separate from the first location in the memory.

10. Software stored in a Computer Software Storage Medium for performing an atomic multiple word write to a memory for use in a processor that does not provide an atomic multiple word write to the memory capability, wherein said software comprises:

A) a set of computer instructions for attempting to set a gate flag associated with a first location in the memory to a first state when in a second state;
B) a set of computer instructions for testing whether the attempt in set (A) was successful;
C) a set of computer instructions for repeating sets (A) and (B) if the testing in set (B) failed;
D) a set of computer instructions for writing a second register to a second location in the memory after the test in set (B) succeeds;
E) a set of computer instructions for writing a first register to the first location in the memory after writing the second register in set (D); and
F) a set of computer instructions for setting the gate flag associated with the first location in the memory to the second state after completing writing the second register to the second location in set (D) and not before completing writing the first register in set (E).

11. The software in claim 10 wherein:

the gate flag associated with the first location in the memory is an otherwise unused bit in the first location in the memory; and set (F) is accomplished in set (E) by storing the first register in the first location in the memory with the gate flag set to the second state.

12. The software in claim 10 wherein:

set (A) further comprises:
1) a set of computer instructions for reading a location in the memory containing the gate flag associated with the first location in the memory into a third register;
2) a set of computer instructions for testing whether the gate flag in the third register is in the second state; and
3) if the gate flag was tested in subset (2) to be in the second state, a set of computer instructions for performing operations comprising:
  a) a set of computer instructions for moving a contents of the third register to a fourth register;
  b) a set of computer instructions for setting the gate flag to the first state in the fourth register; and
  c) a set of computer instructions for atomically comparing the third register to a contents of the location in the memory containing the gate flag, and if the third register matches the contents of the location in the memory containing the gate flag, then writing the fourth register to the location in the memory containing the gate flag.

13. The software in claim 10 wherein:

set (A) further comprises:
1) a set of computer instructions for reading a location in the memory containing the gate flag associated with the first location in the memory into a third register;
2) a set of computer instructions for testing whether the gate flag in the third register is in the second state; and
3) a set of computer instructions for if the gate flag was tested in subset (2) to be in the second state, performing operations comprising:
  a) a set of computer instructions for moving a contents of the third register to a fourth register;
  b) a set of computer instructions for setting the gate flag to the first state in the third register; and
  c) a set of computer instructions for atomically comparing the fourth register to a contents of the location in the memory containing the gate flag, and if the fourth register matches the contents of the location in the memory containing the gate flag, then writing the third register to the location in the memory containing the gate flag.

14. The software in claim 10 which further comprises:
G) a set of computer instructions for attempting to set a gate flag associated with a third location in the memory to the first state when in the second state after attempting to set the gate flag in set (A);
H) a set of computer instructions for testing whether the attempt in set (G) was successful;
I) a set of computer instructions for repeating sets (G) and (H) if the testing in set (H) failed;
J) a set of computer instructions for writing a fourth register to a fourth location in the memory after the test in set (H) succeeds and before setting the gate flag in set (F);
K) a set of computer instructions for writing a third register to the third location in the memory after the test in set (H) succeeds and before setting the gate flag in set (F); and
L) a set of computer instructions for setting the gate flag associated with the third location in the memory to the second state after completing writing the fourth register to the fourth location in set (J) and not before completing writing the third register in set (K).

15. The software in claim 10 which further comprises:
G) a set of computer instructions for attempting to set a gate flag associated with a third location in the memory to the first state when in the second state after attempting to set the gate flag in set (A);
H) a set of computer instructions for testing whether the attempt in set (G) was successful;
I) a set of computer instructions for setting the gate flag associated with the first location in the memory to the second state if the testing in set (H) failed;
J) a set of computer instructions for repeating sets (A), (B), (C), (G), (H), and (I) if the testing in set (H) failed; and
K) a set of computer instructions for writing a fourth register to a fourth location in the memory after the test in set (H) succeeds and before setting the gate flag in set (F);
L) a set of computer instructions for writing a third register to the third location in the memory after the test in set (H) succeeds and before setting the gate flag in set (F); and
M) a set of computer instructions for setting the gate flag associated with the third location in the memory to the second state after completing writing the fourth register to the fourth location in set (K) and not before completing writing the third register in set (L).

16. The software in claim 10 which further comprises:
G) a set of computer instructions for attempting to set a gate flag associated with the second location in the memory to the first state when in the second state after the testing in set (B) is successful and before the writing in set (D);
H) a set of computer instructions for testing whether the attempt in set (G) was successful;
I) a set of computer instructions for setting the gate flag associated with the first location in the memory to a second state if the testing in set (H) failed;
J) a set of computer instructions for repeating sets (A), (B), (C), (G), (H), and (I) if the testing in set (H) failed; and
F) a set of computer instructions for setting the gate flag associated with the second location in the memory to the second state after completing writing the second register to the second location in set (D).

17. The software in claim 10 wherein:

the gate flag associated with the first location in the memory is an otherwise unused bit in the first location in the memory.

18. The software in claim 10 wherein:

the gate flag corresponding to the first location in the memory is a bit in an array in the memory separate from the first location in the memory.

19. A computer readable Non-Volatile Storage Medium encoded with software for performing an atomic multiple word write to a memory for use in a processor that does not provide an atomic multiple word write to the memory capability, wherein said software program comprises:
A) a set of computer instructions for attempting to set a gate flag associated with a first location in the memory to a first state when in a second state;
B) a set of computer instructions for testing whether the attempt in set (A) was successful;
C) a set of computer instructions for repeating sets (A) and (B) if the testing in set (B) failed;
D) a set of computer instructions for writing a second register to a second location in the memory after the test in set (B) succeeds;

E) a set of computer instructions for writing a first register to the first location in the memory after writing the second register in set (D); and F) a set of computer instructions for setting the gate flag associated with the first location in the memory to the second state after completing writing the second register to the second location in set (D) and not before completing writing the first register in set (E).

* * * * *